United States Patent [19]
Lüdemann et al.

[11] Patent Number: 6,006,913
[45] Date of Patent: Dec. 28, 1999

[54] PACKAGING

[75] Inventors: Henning Lüdemann, Memmingen; Robert Linz, Dietenheim; Jürgen Schnäbele, Bernried, all of Germany; Manfred Grünberger, Traun, Austria; Anton Wolfsberger, Engerwitzdorf, Austria; Harald Hammer, Pasching, Austria

[73] Assignees: BP Chemicals PlasTec GmbH, Dietenheim; PCD Polymere Gesellschaft mbH, both of Germany

[21] Appl. No.: 08/662,436

[22] Filed: Jun. 10, 1996

[30] Foreign Application Priority Data

Apr. 9, 1996 [DE] Germany .............................. 196 13 959

[51] Int. Cl.[6] .................................................. B65D 83/04
[52] U.S. Cl. ........................ 206/531; 206/528; 206/532; 206/539; 206/828; 220/359.3; 220/526; 428/35.2; 428/35.7; 428/323; 428/326; 428/327; 428/328; 428/329; 428/330; 428/331; 525/240
[58] Field of Search ..................................... 206/531, 532, 206/539, 528, 828; 428/35.7, 35.2, 323, 326, 328, 329, 330, 331; 220/359.3, 526; 525/240

[56] References Cited

U.S. PATENT DOCUMENTS

| | | | |
|---|---|---|---|
| 3,835,995 | 9/1974 | Haines | 206/539 |
| 3,899,080 | 8/1975 | Brunda | 206/531 |
| 4,869,938 | 9/1989 | Usami et al. | 206/531 |
| 5,522,506 | 6/1996 | Roulin et al. | 206/531 |
| 5,785,180 | 7/1998 | Dressel et al. | 206/532 |

*Primary Examiner*—Fred Teskin
*Attorney, Agent, or Firm*—Leydig, Voit & Mayer

[57] ABSTRACT

A packaging for goods, such as, for example, tablets, capsules or the like, is suggested which is simple to produce and can be handled without problem, comprising a packaging lower part and a cover film, wherein the goods are arranged individually between the packaging lower part and the cover film and enclosed by them, wherein the cover film comprises a pull-off layer and a push-through layer which are designed such that first of all the pull-off layer can be detached from the packaging in sections and the goods then removed individually by being pushed through the push-through layer, wherein the pull-off layer is peelably connected to the push-through layer, wherein the push-through layer is connected to the lower part by means of a sealing layer and wherein the push-through layer is produced on a polymer basis.

72 Claims, 2 Drawing Sheets

FIG. 1

PACKAGING

TECHNICAL FIELD OF THE INVENTION

The invention relates to a packaging for goods, such as, for example, tablets, capsules or the like, comprising a packaging lower part and a cover film, wherein the goods are arranged individually between the packaging lower part and the cover film and are enclosed by them.

BACKGROUND OF THE INVENTION

In order to make the packaging child-proof, which is of significance, in particular, in the case of the packaging for pharmaceuticals, it has already been suggested that the cover film be formed from a pull-off layer and a push-through layer which are designed such that for removing the packaged goods, in particular the tablets or the like, the pull-off layer is first of all to be detached in sections, whereby the push-through layer (in the form of an aluminum film or foil) of the cover film is exposed. This can be pushed through once the pull-off layer has been detached, i.e. the packaged goods can be removed by applying mechanical force to the rear side of the packaging and by pressing the goods through the push-through layer, which thereby tears.

The problem with the known packagings of this type is, however, that the connection between the pull-off layer and the push-through layer, on the one hand, and/or the connection of the cover film with the packaging lower part is inadequate and so, in many cases, the pull-off layer and the push-through layer are pulled off together which means that the packaging is no longer child-proof or, however, the removal of the pull-off layer proves to be very difficult and so older patients, in particular, have difficulty in removing the tablets from the packaging.

The problems are based, in particular, on the fact that with this type of packaging a compromise had to be sought, with which, on the one hand, the cover film adheres firmly enough to the packaging lower part, with which, in addition, the pull-off layer is connected to the push-through layer rigidly enough to prevent any opening of the package without any previous removal of the pull-off layer and, on the other hand, the removal of the pull-off layer from the push-through layer must take place easily enough to ensure a simple removal of tablets. In addition, the pull-off layer must be detachable in sections so that during the desired removal of a tablet from the packaging and the detachment of the associated section of the pull-off layer further tearing and further removal of the entire pull-off layer or larger portions thereof does not result.

In the case of previously known packagings of the type described at the outset, the pull-off layer is often produced from paper and the push-through layer is an aluminum foil. In the case of different packagings, the pull-off layer consists of a paper layer reinforced with plastic and the push-through layer of an aluminum foil. In order to facilitate opening, sections of the pull-off layer and push-through layer are not then sealed to the packaging lower part and so the combined layers consisting of pull-off layer and push-through layer can be gripped together more easily. In order, however, to avoid any unintentional opening, these sections which are not sealed to the lower part are arranged in the interior of the overall surface of the packaging and are not accessible until a section comprising a single tablet has been broken out of the packaging along perforation lines.

To remedy these problems, U.S. Pat. No. 4,537,312 proposes providing the packaging lower part, which is provided with pockets for accommodating the tablets, capsules, etc., with apertures between the pockets and covering the packaging lower part from above and from below with a plastic material and sealing this in the edge region and in the region of the apertures. In order to ensure a good abutment of the covering on the side of the pockets of the lower part, it is then suggested to arrange suitable apertures, through which the pockets can project, in this part of the covering in the region of the pockets of the packaging lower part.

This type of packaging is extremely complicated and still does not eliminate the problem of the complicated handling and the partially undesired opening of the individual pockets of the packaging lower part during removal of the pull-off layer.

It is the object of the invention to propose a packaging which is simple to produce in comparison with the known packagings of the type described at the outset and eliminates the problems during handling which are described in the above.

OBJECTS AND SUMMARY OF THE INVENTION

This object is accomplished in accordance with the invention, in a packaging described at the outset, in that the pull-off layer is peelably connected to the push-through layer, that the push-through layer is connected to the lower part by means of a sealing layer, and that the push-through layer is produced on a polymer basis.

With respect to the complex object specified above, the core of the present invention is to be seen first of all in the fact that in combination the pull-off layer is peelably connected to the push-through layer, wherein peelable connections such as those known per se can also be used in this case, the push-through layer is connected to the lower part by means of a sealing layer which can likewise be known per se, and, above all, the push-through layer is produced on a polymer basis.

This group of measures allows an exact coordination of the individual layers and their connections with one another which, in the end, ensures a secure closure of the packaging, on the one hand, and a reliable opening in the prescribed sequence of steps, on the other hand.

DESCRIPTION OF THE INVENTION

The packaging lower part will preferably be a thermoformed packaging lower part, recesses resulting in the film of the packaging lower part due to the thermoforming process which can accommodate the goods individually or in a predetermined quantity or number.

With regard to the purity of type of the packaging often aimed for, the packaging lower part is preferably produced from a plastic material which is preferably produced from a plastic material similar to the material of the push-through layer. Ideally, the composition of the cover film as a whole and of the packaging lower part is then at least similar and so the resources required for reuse or recycling of the packaging and the waste which results during the production of the packaging is simplified since a separation of useful materials need no longer take place.

The sealing layer, which ensures a firm and permanent connection between push-through layer and packaging lower part, can be applied alternatively to the lower part or rather to its surface to be connected to the push-through layer or, however, to the surface of the push-through layer which is intended to be connected to the lower part, or, however, to the corresponding surface of the lower part as well as to the surface of the push-through layer which are intended to be connected to one another.

The question of the use of one or two sealing layers or rather the decision to apply the sealing layer on the side of the push-through layer or on the side of the lower part is dependent on the polymer materials used not only for the push-through layer but also for the lower part, on the one hand, and, on the other hand, on the required strength of the seal.

The material for forming the sealing layer is preferably produced with the use of polyolefins having a low melting point, the following polymers being recommended, in particular, as essential components of the sealing layer:

Polypropylene random copolymers, terpolymers, ionomers, ethylene copolymers, in particular ethylene butyl acrylate, ethylenevinyl acetate, ethylene ethyl acetate, ethylene acrylic acid and ethylene maleic anhydride copolymers or linear low, very low and ultra low density polyethylene copolymers, olefinic unsaturated carboxylic acids or carboxylic acid derivatives, or polyolefins modified with anhydride, polyethyl oxazolines or stearyl stearamide, such as described, for example, in EP-A-406 568 or EP-A-188 123, grafted polyolefins containing styrene and ethylene butylene blocks, for example Kraton ® of the Shell company, polyolefins produced using a metallocene catalyst, random heterophase copolymers, highly amorphous polypropylenes or mixtures of two or more of the aforementioned polymers or polymer systems.

Particularly preferred are sealing layers which comprise random copolymers of propylene with ethylene, butene, hexene and/or octene as comonomer and/or comprise random heterophase copolymers of propylene with ethylene, butene, hexene and/or octene as comonomer.

A different, additionally preferred type is present in terpolymers consisting of propylene, ethylene and an additional α-olefin, in particular butene, nexene and octene.

Particularly preferred are polyolefins grafted with maleic anhydride as well as copolymers containing styrene and ethylene butylene blocks and preferably grafted with maleic anhydride, for example the products of the Mitsui Petrochemicals company marketed under the brand name Admer®.

At the same time, the aforementioned propylene random copolymers, the random heterophase copolymers and terpolymers which are produced using a metallocene catalyst are particularly preferred.

The sealing layer is preferably coextruded with the lower part and/or the push-through layer. In this respect, additional production steps are omitted and a good adhesion of the sealing layer to the lower part or the push-through layer, respectively, is ensured.

At the same time, the sealing layer can also be applied to the push-through layer and/or the lower part as a lacquer coating.

PVC, polystyrene, styrene copolymers, polyester or, in particular, polyolefins have proven to be suitable plastic materials for the push-through layer as predominant component.

Particularly preferred materials for the push-through layer are present in the polypropylenes, above all high crystalline polypropylenes (HCPP) and, in particular, in the PPs or HCPPs produced using a metallocene catalyst. These materials are particularly suitable for forming the main component of the push-through layer. Suitable, high crystalline polypropylenes are known, for example, from EP 0255 693 B1 and have a high, isotactic proportion of pentadene (recommended is the range of 0.955 to 1.0) (cf. EP 0255 693 B1 for the method of measurement for this).

Preferred polyolefins are to be seen in polypropylenes, and their particularly good physical properties, such as, for example, blocking efficiency for steam, transparency, chemical stability etc.

The average molecular weight of the polymers in the push-through layer is preferably selected in the range of approximately 10,000 to approximately 600,000.

The module of elasticity (measured in accordance with DIN 53457 on films 50 $\mu$m thick) is preferably 1200–1800 N/mm$^2$ for the pure, high crystalline polypropylene to be used in the push-through layer. In the case of the filled polypropylene matrix the module of elasticity may increase, for example, to values (in N/mm$^2$) of 1800 to 2000 with a 5% by weight filling of talc, 2200 to 2400 with a 10% by weight filling of talc or 3000 to 3400 with a 20% by weight filling of talc.

The push-through layer advantageously comprises a polymer matrix with a particulate filler which is selected and contained in such a proportion in the matrix that the puncture resistance of the push-through layer is reduced to below a limit of 450 N/mm (method of measurement according to DIN 53373).

This limit applies for films approximately 150 $\mu$m in thickness. For much thinner or thicker films or push-through layers the corresponding limits can be derived from these values. In the case of the specified limit, it is possible to press goods not sensitive to pressure through the cover film of the goods carrier, even though with some use of force. In the case of more sensitive products, a lower limit will preferably be selected for the puncture resistance, and this value is then preferably at approximately 50 to approximately 200 N/mm. Lower puncture resistances may be recommendable in individual cases where goods very sensitive to pressure are to be packaged. However, it should be noted in this respect that with the reduction in the puncture resistance the protective effect of the packaging against damage to the goods themselves is, of course, decreased and so an optimum for the majority of the pharmaceuticals to be packaged is to be seen in the range up to approximately 100 N/mm. The reduction in the puncture resistance to lower values is, however, a more minor problem with the present invention since the push-through layer is still protected by the pull-off layer and is not exposed until the moment the packaging is opened due to the removal of the pull-off layer.

For the handling of the packaging by the consumer, i.e. in particular when opening the packaging and, therefore, the goods, a further property of the push-through layer comes into play secondarily, namely the so-called resistance to further tearing which determines the force requirements necessary to allow a push-through layer which has been penetrated once to be torn further open and thus completely release the packaged product. This property can also by influenced by the selection of the filler as well as its proportion in the polymer matrix, a resistance to further tearing of less than 30 N (method of measurement according to DIN 53363) being preferably aimed at in this case. This numerical value applies, in particular, for films of approximately 150 µm in thickness but can also be used essentially for considerably thinner or thicker layers or films. An acceptable value of the resistance to further tearing for the handling, in particular, of goods sensitive to pressure as well is between approximately 2 and 12 N, whereby it should again be noted that, of course, considerably lower values are possible but any reduction is subject to limits in view of the protection of the goods by the push-through layer. A preferred range for the resistance to further tearing is in the range of 3 to 4 N. Low values for the resistance to further tearing are, however, again to be seen in conjunction with the protective effect of the pull-off layer.

The inventive push-through layer contains the filler as a homogeneous addition to a plastic material which is already completely polymerized. The filler is not therefore—as known in conjunction with filler-reinforced plastics—dispersed in the polymerization reaction mixture consisting of monomer and/or prepolymer and incorporated into the polymer matrix during hardening of the reaction mixture. However, it is, of course, conceivable to use such reinforced plastic material as polymer matrix in specific applications, also in conjunction with the present invention.

A broad range of fillers is available for the fillers of the push-through layer. These can be selected not only from inorganic but also from organic substances.

Preferred examples for the organic substances are, e.g., halogenated hydrocarbon polymers, in particular PTFE, polyether sulfones, which have, like the PTFE, a melting point of >300° C., as well as duroplastic materials. In the case of the organic substances which are intended to serve as fillers, it is important that these do not liquefy during the processing of the polymer matrix material, during which temperatures of 220° C. and more can occur, and then form a homogeneous solution with the polymer matrix material but that these remain essentially in particle form in the polymer matrix during processing and thus serve to weaken the continuous polymer matrix layer and, therefore, to reduce the puncture resistance and, where applicable, the resistance to further tearing accordingly. On the other hand, polymers with a lower melting point can also be used as fillers, where necessary mixed with additional fillers of a different type, when it must only be ensured that in the case where not only the matrix polymer but also the filler polymer are simultaneously present during the processing in a molten state two separate phases also remain in the melt, similar to the distribution of an oil-in-water emulsion.

For the inorganic component of the filler, the substance can be selected from the family of silicon dioxides, in particular in the form of glass or quartz, silicates, in particular in the form of talc, titanates, $TiO_2$, aluminum oxide, kaolin, calcium carbonates, in particular in the form of chalk, magnesites, MgO, iron oxides, silicon carbides, silicon nitrides, barium sulfate or the like.

When selecting the inorganic or organic substances as components of the filler, the goods to be packaged will always have to be taken into consideration as well and their sensitivity with respect to one or other of the additional substances in the polymer matrix.

The form of the filler particles will most often be granular or flake-like but fibrous or rod-shaped filler particles are also possible not only as an essentially unitary form but also in a mixture with other forms as filler particles.

The particle size of the filler (measured over the greatest extension of the particle) is preferably, on average, approximately 5 to approximately 100 µm. The selection of the particle size is, of course, also determined to a not inconsiderable extent by the thickness of the layer to be produced. Care will thus need to be taken that the average extension of the particles keeps a clear distance in relation to the thickness of the layer to be produced. Average particle sizes of between 20 µm and 60 µm, in particular with layer thicknesses of 80 µm to 100 µm, are preferred.

In order to ensure that the filler does not lead to a reinforcement of the polymer matrix, care should be taken that the filler particles adhere as little as possible to the polymer matrix. However, the adhesion forces between the particles and the filler matrix should at least be clearly less than the tensile strength of the matrix itself. Care will therefore have to be taken, in particular, in the case of the inorganic filler particles that these are essentially free from so-called adhesive agents. Such adhesive agents are customarily used for the production of filled plastics, with which the focus is, however, on the particular strength of the material.

On the other hand, the aim is, of course, for the filler particles to be distributed in the polymer matrix as evenly as possible and for this distribution to also be maintained during the production process and so supplementary agents which improve the dispersibility of the filler particles in the matrix are preferably added.

Particularly suitable as dispersing agents are organic substances which have a low melting point and a large wetting capability for the filler. Concrete examples are low-molecular polyolefin waxes. The dispersing agents are preferably applied to the filler particles before these are mixed, in particular, kneaded with the granulate of the matrix polymer.

The thickness of the push-through layer is preferably selected to be from 20 µm to approximately 600 µm which, on the one hand, ensures an adequate stability of the push-through layer for protecting the packaged goods and, on the other hand, keeps the forces necessary for opening the packaging within the prescribed limit, within which at least goods insensitive to pressure can still be removed from the packaging by the average buyer without any problem by pushing them through the push-through layer.

The push-through layers on a polymer basis described thus far achieve the push-through property in that fillers were embedded in the matrix which were selected with a view to their composition and their proportion such that a weakening of the polymer matrix surrounding them occurred, whereby the puncture resistance of the film was reduced to such an extent that the packaged goods may be pressed through the film due to this tearing or breaking open. This generally required, in addition, an optimization of the fillers and their proportion with respect to the resistance to further tearing of the film. Inorganic and organic fillers were suggested as fillers, whereby for organic materials it was recommended that an organic second phase be used which, if present in a liquid form, is maintained during melt extrusion as a second phase within the first phase in the case of the extruded film.

Due to the requirement that the push-through property of the push-through layer should be ensured by the selection of the fillers and, in particular, their proportions in the polymer matrix as well, push-through layers resulted which are always opaque. The light impermeability of the layers is based essentially on the fact that within the layer material a large number of boundary surfaces, i.e. the boundary surfaces between the polymer matrix and the inserted phase/filler, at which reflections, dispersion etc. occur, prevent any passage of light and, therefore, any transparency of the material even with slight layer thicknesses.

In addition, the selection of the fillers or rather the second phase in the matrix was always limited by the fact that the corresponding push-through properties of the push-through layers, such as, for example, the reduction in the puncture resistance to specific values or also the reduction in the resistance to further tearing, had to be ensured by way of the selection of the filler/the organic material which was intended to form the second phase.

In many cases, it is, however, desirable, in order to achieve specific qualities of a film, to have a free hand when selecting fillers and their proportions which are to be added, or, however, it may be desirable to produce transparent push-through films which would make a new type of push-through packaging possible.

Push-through layers, which fulfill such a requirement, imply that the polymer phase (preferably polyolefin) contains a hydrocarbon resin component in a dissolved form, wherein the hydrocarbon resin component is different to the polymer of the polymer phase, comprises cyclic side groups on the polymer chain and is contained in the push-through layer with a proportion of at least approximately 3% by weight of the total mass and wherein the average molecular weight of the hydrocarbon resin component (B) $\leq 10,000$.

This push-through layer therefore represents, in contrast to what has been described thus far, a single-phase material and no longer attains the push-through capability in an interruption of the continuous polymer phase by a plurality of filler particles but by the embrittlement due to the increase in the glass transition temperature by way of dissolution of a selected hydrocarbon resin component in the polymer phase.

This means that the possibility is created for the first time of producing transparent push-through layers or of filling the push-through layers with fillers, the selection of which can be made completely independently of the desired push-through properties of the layer.

In this respect, the polyolefin of the polymer phase or rather the polyolefin phase acts as the solvent phase while the hydrocarbon resin is present in this phase dissolved in the end product. It has been shown that, in order to obtain adequate push-through properties, at least approximately 3% by weight of the hydrocarbon resin component must be added to the solvent phase, i.e. the polyolefin.

The polyolefin of the polyolefin phase preferably comprises polyethylene, polypropylene, including high crystalline PP as well as nucleated PP, copolymers and terpolymers of ethylene, propylene and/or higher $\alpha$-olefins.

Approximately 3% by weight of the hydrocarbon resin component (B) are already completely sufficient, for example, in those cases, in which nucleated PP is used as polyolefin (A).

Examples of suitable nucleation agents are talc, sodium benzoate, sorbite derivatives, organic phosphates, such as, for example, sodium 2,2'-methylene-bis-4,6-di-tert-butyl phenyl phosphate, benzoic acid derivatives, cross-linked polypropylene as well as mixtures of the aforementioned nucleation agents.

During the production of this type of push-through layer, a so-called $\alpha$-nucleation agent is preferably added during compounding, i.e. during the adding of the resin and, where applicable, the fillers. Alternatively, a polyolefin (A) which is already nucleated can be used as initial material. The proportion of the nucleation agent is normally in the range of approximately 50 ppm to 1% by weight in relation to the total weight of the film and is preferably in the range of 0.05 to 0.5% by weight. The effect of the $\alpha$-nucleation agents is in increasing the crystallization speed of the polyolefin component (A) which results in a higher rigidity of the material and a lower puncture resistance.

The low value for the molecular weight of the hydrocarbon resin component (B) is at approximately 500 while a preferred upper limit is at approximately 5,000. If hydrocarbon resin components with a molecular weight of lower than 500 are selected, a certain stickiness results not only of this component but also of the resulting film product.

The total content of the hydrocarbon resin component (B) in the finished film is at the most approximately 25–30% by weight. Proportions higher than this are possible in principle but make the production more expensive and so the profitability of the film is then questionable.

The push-through layers described first of all, in particular those filled with inorganic fillers, occasionally cause problems during production when the filler content is high since this can lead to deposits of the solid fillers in the extruder nozzle. This applies in part during the use of filler contents of >45% by weight. Such deposits do not occur during the production of single-phase push-through layers.

Advantages of the single-phase push-through layer are to be seen in their improved processability which is attributable, in particular, to the possible low contents of fillers. In conjunction therewith, the single-phase push-through layer can be produced in thinner layers, for example layers 30 $\mu$m thick can be produced without problem and even layers 15 $\mu$m thick and thinner layers can be produced without more special measures. In this respect, there are clear limitations in the case of the push-through layers filled with inorganic fillers since, in this case, the grain diameter of the fillers must be taken into consideration. In addition, not only are undrawn layers, such as those known from the state of the art, suitable as a push-through layer but also drawn layers. Drawn push-through layers have, in particular, the advantage that the rigidity, the optical appearance (luster), the transparency, barrier properties against steam and the resistance to low temperatures are improved.

One example for the independent selection of the fillers for achieving special effects in the case of the inventive push-through layers is that very fine fillers may be selected (also in the case of very thin layers) which, in the state of the art, have sometimes increased the viscosity of the layer and, therefore, have increased the puncture resistance instead of reducing it. Very fine fillers ensure a smooth surface of the layer.

The cyclic side groups on the polymer chain of the hydrocarbon resin component (B) discussed in the above and also these polymers themselves can be present partially or completely hydrogenated. For example, these hydrocarbon resins can be amorphous, low-molecular polymers consisting of, for example, petrochemical raw materials. They may be formed from aliphatic and/or aromatic monomers, such as, e.g., styrene, vinyltoluene or alphamethylstyrene as well as additional aromatic hydrocarbons with substituted vinyl groups. These polymers can be homopolymers, copolymers as well as polymers with an optional number of monomers and have a broad spectrum of molecular weights.

The basis for the hydrocarbon resin component can, however, also be formed by natural products, such as, for example, colophony resins. Such products are, for example, offered by the Herkules company under the brand names "Regalrez" or "Regalite".

A preferred weight proportion of the hydrocarbon resin component (B) in the film is at 5 to 10% by weight. The hydrocarbon resin component is preferably an amorphous material.

Preferred, transparent push-through layers consist essentially of the polyolefin phase (A) and the hydrocarbon resin (B). Such push-through layers have an excellent transparency, very good printing properties and still have a puncture resistance which recommends their use even for sensitive pharmaceuticals in tablet form.

The possible filler content of the single-phase push-through layer already discussed in the above can be varied in the range of 0 to 35% by weight, the upper limit preferably being drawn at ≦30% by weight, even better at 25% by weight. Particles with an average particle size in the range of 1 μm to 60 μm are used as fillers, this value being dependent, on the one hand, on the selected filler and, on the other hand, on the desired layer thickness. Preferred materials for fillers are, from the inorganic range, chalk and talc.

The molecular weight of the polymer which forms the solvent phase, i.e. the solvent polyolefin, is preferably ≧10,000. An upper limit for this is to be set at approximately 1.2 million, preferably at 600,000.

No details have so far been given concerning the concrete design of the peelable connection of pull-off layer and push-through layer. Several alternatives can be considered in this respect.

On the one hand, the peelable connection can be designed as a separate layer as a seal/peel layer. On the other hand, it is likewise possible to obtain the peelable connection by coextruding pull-off layer and push-through layer with a corresponding formulation of the two layers.

If the seal/peel layer is chosen as the peelable connection of pull-off layer and push-through layer, this can then be coextruded together with the pull-off layer and/or the push-through layer or applied to the pull-off layer or the push-through layer as a separate layer, for example as a type of adhesive layer or also as a lacquer coating.

Preferred seal/peel layers comprise a mixture consisting of two incompatible polymer components I and II, wherein the component I is a propylene homopolymer or a copolymer of ethylene and propylene or ethylene and butylene or propylene and butylene or ethylene and a different α-olefin with 5 to 10 carbon atoms or propylene and a different α-olefin with 5 to 10 carbon atoms or a terpolymer of ethylene and propylene and butylene or ethylene and propylene and a different α-olefin with 5 to 10 carbon atoms or a mixture of two or more of the specified homopolymers, copolymers and terpolymers or a blend of two or more of the specified homopolymers, copolymers and terpolymers, where applicable mixed with one or more of the specified homopolymers, copolymers and terpolymers and wherein the component II is preferably a high density polyethylene, medium density polyethylene, low density polyethylene, linear low density polyethylene, very low density polyethylene or ultra low density polyethylene which are produced, in particular, using a metallocene catalyst.

The component I of the peelable mixture or the blend is essentially
a propylene homopolymer or
a copolymer of
ethylene and propylene or
ethylene and butylene or
propylene and butylene or
ethylene and a different α-olefin with 5 to 10 carbon atoms or
propylene and a different α-olefin with 5 to 10 carbon atoms or
a terpolymer of
ethylene and propylene and butylene or
ethylene and propylene and a different α-olefin with 5 to 10 carbon atoms or
a mixture of two or more of the specified homopolymers, copolymers and terpolymers or
a blend of two or more of the specified homopolymers, copolymers and terpolymers, where applicable mixed with one or more of the specified homopolymers, copolymers and terpolymers.

As particularly preferred, the component I consists essentially of
a copolymer of
ethylene and propylene or
ethylene and butylene-1 or
propylene and butylene-1 or of
a terpolymer of
ethylene and propylene and butylene-1 or of
a mixture of two or more of the specified,
  particularly preferred homopolymers, copolymers and terpolymers or of
a blend of two or more of the specified,
  particularly preferred homopolymers, copolymers and terpolymers, where applicable mixed with
one or more of the specified homopolymers, copolymers and terpolymers,
wherein, in particular, propylene homopolymer or random ethylene propylene copolymers with
an ethylene content of 1 to 15% by weight, preferably 5 to 8% by weight, or
random propylene butylene-1 copolymers with
a butylene content of 4 to 25% by weight, preferably 10 to 20% by weight,
each related to the total weight of the copolymer, or
random ethylene propylene butylene-1 terpolymers with
an ethylene content of 1 to 10% by weight, preferably 2 to 6% by weight, and
a butylene-1 content of 3 to 20% by weight, preferably 8 to 10% by weight,
each related to the total weight of the terpolymer, or a blend of an ethylene propylene butylene-1 terpolymer and
a propylene butylene-1 copolymer
with an ethylene content of 0.1 to 7% by weight
and a propylene content of 50 to 90% by weight
and a butylene-1 content of 10 to 40% by weight,
each related to the total weight of the polymer blend, are preferred.

The propylene homopolymer used as or in the component I predominantly contains propylene (at least 90% by weight) and has a melting point of 140° C. or higher, preferably 150 to 170° C., wherein isotactic homopolypropylene with a content soluble in n-heptane of 6% by weight and less, related to the isotactic homopolypropylene, is preferred. The homopolymer of the component I or the homopolymer contained therein generally has a melt-flow index of 1 g/10 min to 30 g/10 min, preferably 1.5 g/10 min to 6 g/10 min, measured at 230° C. and a force of 2.16 kg (DIN 53 735).

The copolymers described in the above generally have a melt-flow index of 1.0 to 30 g/10 min, preferably from 3 to 15 g/10 min. The melting point is in the range of 120 to 155° C. The terpolymers used in the layer/layers have a melt-flow index in the range of 1.5 to 30 g/10 min, preferably from 3 to 15 g/10 min, and a melting point in the range of 120 to 140° C. The blend described above and consisting of copolymers and terpolymers has a melt-flow index of 5 to 9 g/10 min and a melting point of 120 to 150° C. All the melt-flow indices specified above are measured at 230° C. and a force of 2.16 kg (DIN 53 735). Other layers consisting of copolymers and/or terpolymers preferably form the cover layers of sealable embodiments of the film.

The component II of the peelable mixture is a polymer which is incompatible with the olefin polymers described in the above and is essentially built up from ethylene sequences. "Incompatible polymer" means in the sense of the present invention that the incompatible polymer is present as a separate phase besides the olefin polymer. Preferred are high density polyethylene, medium density polyethylene, low density polyethylene, linear low density polyethylene, very low density polyethylene and ultra low density polyethylene. These ethylene polymers generally contain a small proportion of <25% by weight, preferably 1 to 15% by weight, of comonomer. Olefins with 3 to 10 C-atoms are suitable as comonomers, wherein The incompatible polymer is likewise preferably a polyolefin, for example built up on the basis of ethylene, wherein the component I or the basic matrix is based on propylene.

The blend displays two or more separate melting peaks in a melting diagram recorded by means of differential scanning calorimetry. The first melting peak is in the range of 105 to 135° C., the second and possibly third melting peaks in the range of 120 to 170° C.

The ratio (weight ratio) of the two incompatible polymer components I and II of the mixture or the blend can be varied within broad limits depending on the desired peeling force. The ratio of the components I and II is preferably in a range of I:II=5:95 to I:II=95:5, preferably between I:II=30:70 to I:II=70:30, in particular at I:II=50:50.

The seal/peel layer can alternatively consist of a mixture which comprises:

a1) 30 to 80% by weight of a polymer mixture, consisting of
  a1.1) 60 to 98% by weight of a crystalline copolymer consisting of propylene with ethylene and/or an α-olefin of the general formula $CH_2$—CHR, wherein R is a linear or branched alkyl radical with 2 to 8 carbon atoms, containing 85 to 99.5% by weight of propylene and
  a1.2) 2 to 40% by weight of an elastic copolymer consisting of ethylene and propylene and/or an α-olefin of the general formula $CH_2$—CHR, containing 20 to 70% by weight of ethylene or
a2) 30 to 80% by weight of a highly amorphous polypropylene with a crystalline polypropylene proportion of up to 10% by weight with a melting enthalpy of at the most 40 J/g and a melt-flow index of between 0.1 and 100 g/10 min, wherein the polypropylene can be a homopolymer of the propylene or a copolymer of the propylene with one or more α-olefins and a propylene proportion of at least 80 mol %, and
a3) 70 to 20% by weight of an incompatible ethylene polymerisate.

The peelability is preferably given at a force initiation of less than 30 N/15 mm.

The peeling force for removing the pull-off layer from the closed pharmaceutical packaging should not, as far as possible, exceed 5 N, preferably 3 N and even more preferred 2 N at a peeling front 22 mm in width in order to make the opening of the packaging easy even for patients handicapped by illness.

In addition, the seal/peel layer should withstand sealing temperatures of up to 180° C. without the peeling properties altering noticeably.

A broad range of materials is suitable for the pull-off layer which has not so far been discussed in detail. In this respect, however, pull-off layers are particularly preferred which are produced from a thermally stable material, in particular unfilled and filled polypropylene homopolymer, high crystalline polypropylene, paper, or preferably oriented filled or unfilled polyamide, polyester, or polypropylene.

The cover film can have, apart from the pull-off layer and the push-through layer, a heat-resistant protective layer (such as, for example, a protective lacquer) for protecting printings on the cover film or for avoiding adhesion to sealing tools.

For a great number of applications, in particular for the packaging of pharmaceuticals, the lower part of the packaging should be sealed to the cover film along sealing seams around the individual goods so as to be essentially moistureproof and, where necessary, essentially oxygen-tight.

For the purpose of facilitating the opening of the packaging, the cover film should have a tear-initiation area which is designed, for example, such that the cover film can first of all be grasped as a whole but during removal of the cover film the pull-off layer of the cover film is separated from the push-through layer along predetermined contours and the pull-off layer can be detached further on its own. This has the special advantage that the tear-initiation area contains not only the pull-off layer but also the push-through layer, whereby a thicker layer which can be gripped more easily is available in the tear-initiation area.

The contours of the tear-initiation area are preferably designed as an interrupted line, a saw tooth or wavy shape or an angular shape directed contrary to the pull-off direction. This means that at the beginning of the separation of pull-off layer and push-through layer less force is necessary since, first of all, the separation only takes place essentially punctually or in the region of a narrow peeling front and the complete separation of the entire peeling front occurs only during the course of further tearing.

In order to facilitate the gripping of the tear-initiation area, it is preferably provided for an easily grippable section or surface area of the cover film to be designed as a grip tab and not to be sealed to the packaging lower part. In order, however, to avoid any unintentional initial tearing in such an embodiment, it is suggested that the grip tab be connected, where necessary, with the packaging lower part via one or several sealing points having a small area to ensure the plane state.

In the case of the cover film, the pull-off layer is advantageously connected in an areal or stippled manner to the seal/peel layer and the push-through layer by means of a thermolaminating process.

For packaging products sensitive to oxygen, an oxygen barrier layer can be incorporated not only in the packaging lower part but also in the cover film.

This can consist, for example, of polyamide, polyethylene terephthalate, ethyl vinyl alcohol, PVDC, PVDF. It is also possible to metallize the cover film as well as apply metal oxide layers consisting of $SiO_x$, $MgO_x$, or $Al_2O_x$ which can, where necessary, also be lacquered.

Figure 1:
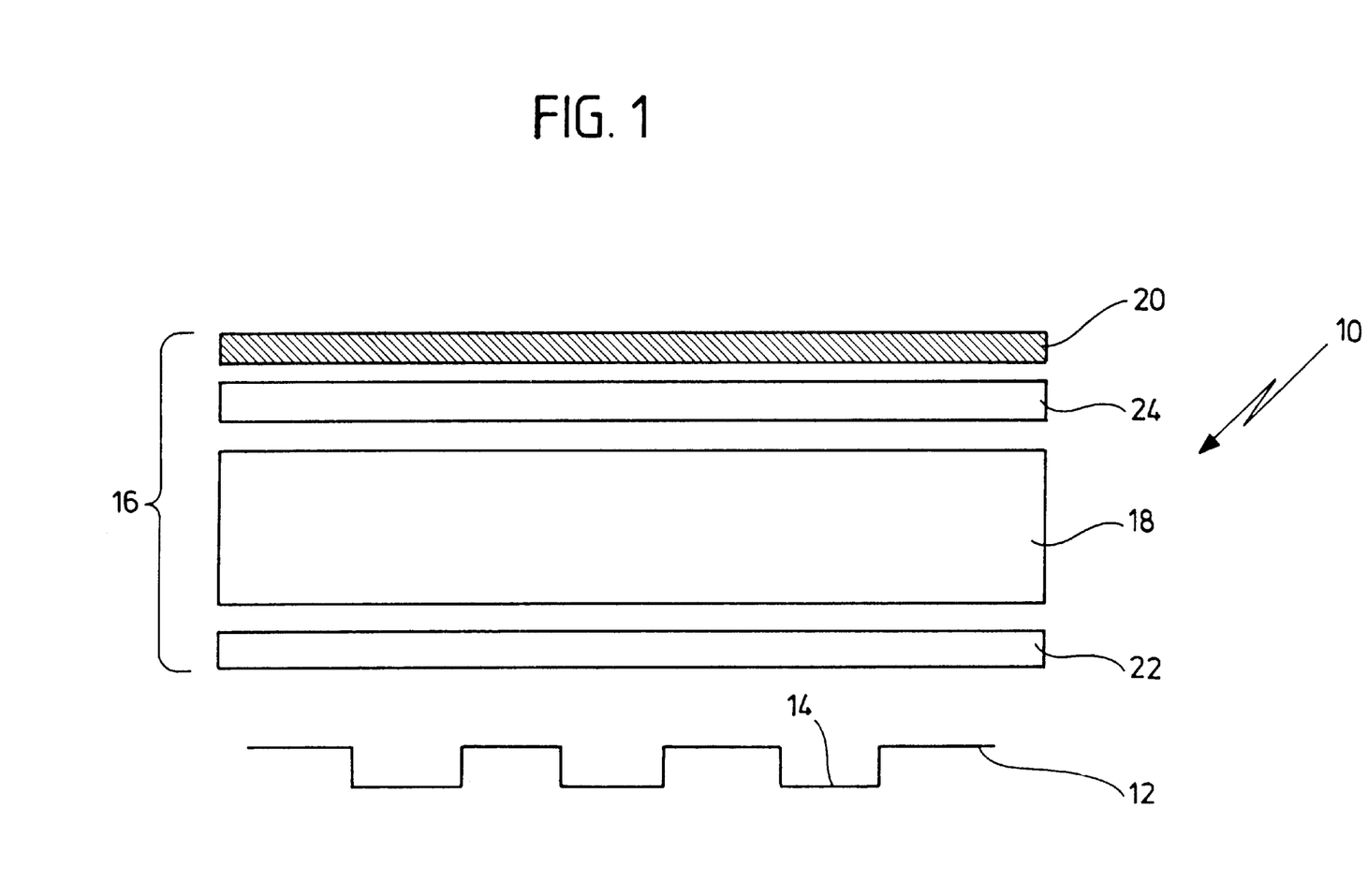
FIG. 1 is a schematic cross sectional illustration of a packaging in accordance with one embodiment of the invention.

FIG. 1 shows an inventive packaging which is provided as a whole with the reference numeral 10 and comprises a packaging lower part 12 with recesses or small pockets 14 which are formed in a deep-drawing process for accommodating individual goods and a cover film which is designated as a whole with the reference numeral 16 and is sealed onto the lower part 12 once the goods, for example tablets or capsules, have been arranged in the small pockets 14.

The cover film in this example is made up of a push-through layer 18, a pull-off layer 20, a seal/peel layer 24 arranged between the push-through layer 18 and the pull-off layer 20 and a sealing layer 22 arranged on the underside of the push-through layer.

In this respect, the push-through layer 18 is preferably coextruded together with the sealing layer 22 and the seal/peel layer 24. Subsequently, the pull-off layer which is produced separately is applied to the push-through layer coextrudate in a separate laminating step. In this case, a connection over the entire surface can be achieved or, if desired, a stippled or rather punctual connection can be produced between the push-through layer coextrudate and the pull-off layer.

The cover film 16 produced in this manner is then sealed onto the packaging lower part 12 as described above.

In the cover film 16, the seal/peel layer undertakes a dual function in that it, on the one hand, provides for the cohesion of the cover film layers and, on the other hand, produces a peelable connection between the push-through layer 18 and the pull-off layer 20.

Figure 2:
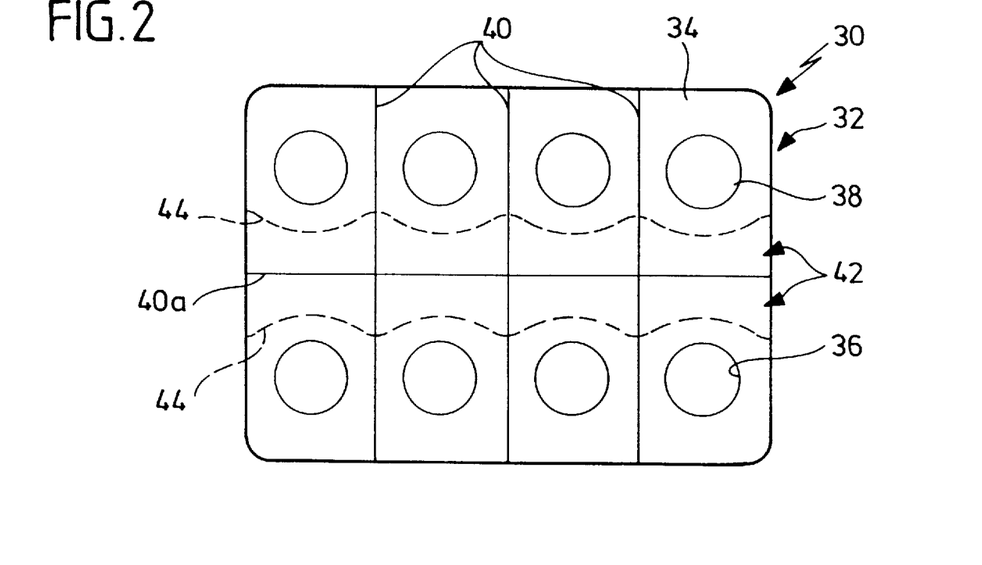
FIG. 2 is a plan view of another embodiment of the packaging of the invention.

FIG. 2 shows an illustration of an inventive tablet blister pack 30 which follows, in principle, the construction described in conjunction with FIG. 1. The blister pack has a cover film 34 sealed to a packaging lower part 32. The sealing is thereby carried out such that a sealing surface results around the small pockets 36 integrally formed in the packaging lower part 32 which is essentially moistureproof and, preferably, also oxygen-tight. In the sealing tool, the cover film supported on the deep-drawn film of the packaging lower part surrounding the small pockets is pressed such that its originally honeycomb-like pattern, which originates from a stippled sealing of push-through layer and pull-off layer, is essentially flattened.

The tablet blister 30 is designed to be dividable via perforation lines 40, 40a so that each individual tablet can be separated from the overall packaging together with the packaging part surrounding it.

On both sides of the perforation line 40a forming the packaging longitudinal axis, care is taken by way of a corresponding contouring of the sealing tool or the sealing receiving means that no or only a slight sealing results between the cover film 34 and the packaging lower part 32. These regions 42 of the cover film which are not or only slightly sealed form grip tabs which are accessible once a packaging portion has been separated from the overall blister pack.

The boundary line 44 between the grip tab 42 and the rigidly sealed regions of the cover film 34 around the small pockets 36 accommodating the tablets 38 preferably deviates from the form of a straight line so that when the cover film is removed from the packaging only a relatively narrow peeling front results first of all, at which the separation of pull-off layer and push-through layer must take place. In this way, the peak forces occurring during the removal and separation of these layers may be reduced without problem to a value below 10 N. This means that not only is a simple peelability realized but, in particular, an essential precondition created so that during the separation of these layers the push-through layer remains reliably sealed to the blister lower part.

The boundary lines 44 can have the slightly curved shape shown in FIG. 2 but they can also extend at an angle pointing towards the perforation line 40a or be designed in the shape of a wavy line with a relatively small wave length or any other suitable line shape which achieves the purpose defined above of a relatively narrow peeling front at the beginning of the separation procedure.

Figure 3:
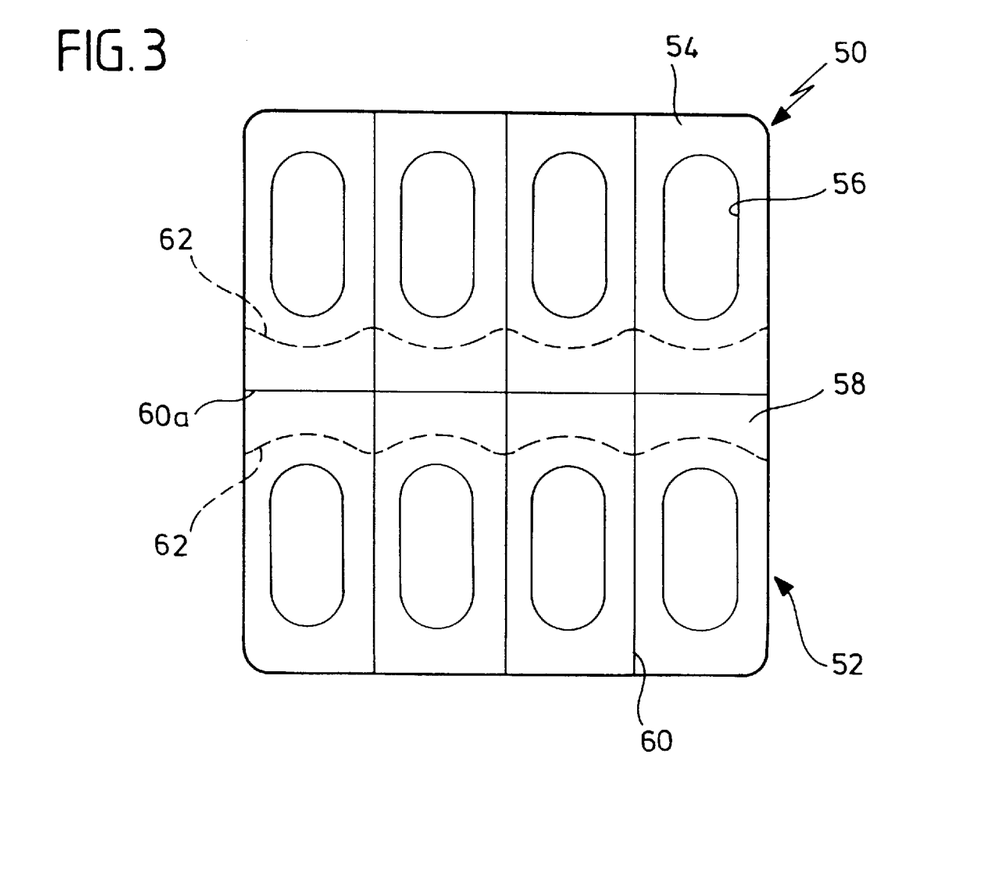
FIG. 3 is a plan view of yet another embodiment of the packaging of the invention.

Finally, FIG. 3 shows a capsule blister 50 with a completely transparent blister lower part 52 and a likewise completely transparent cover film 54. The capsules are accommodated in small pockets 56 which have been formed in the blister lower part by way of thermoforming. Around the small pockets 56 the cover film 54 is again sealed over the entire surface with the blister lower part, although along the central axis of the blister 50 regions 58 of the cover film 54 remain unsealed in order to form grip tabs. The blister pack can again, as already described for the blister shown in FIG. 2, be separated along perforation lines 60, 60a and the capsules may be removed analogously to the tablets of the blister of FIG. 2, for which reason reference is made to the above description with respect to details. The separation of the cover film 54 into pull-off layer and push-through layer results during opening of the individual blister section along the line 62 which forms at the same time the boundary line for the grip tabs.

EXAMPLES

The inventive packaging will be explained in greater detail in the following on the basis of examples:
Production of the Push-Through Layer In a first step, a polymer granulate is mixed with the filler amounts and subsequently extruded or calendered. The mixing, in particular the homogenization, can take place by means of kneading in accordance with known processes, in particular twin-screw compounding. The individual components can, however, also be mixed with one another in a dry mixing process. A better homogeneity, i.e. a more even distribution of the fillers in the polymer matrix, is achieved by means of the preceding production of a so-called compound.

Treatment of the filler particles with dispersing agents should take place, in any case, prior to the blending with the matrix polymer.

The compound is melted in the extruder, namely at melt temperatures of approximately 220° C. and more as well as at a melt pressure of up to 250 bar. The melt is preferably cooled over a chill roll at 20° C. to approximately 80° C. but other cooling processes, where necessary with a surface treatment combined with a corona pretreatment, are also possible.

The push-through layer is then cut and wound.

When polypropylene is used as polymer, a homopolymer polypropylene having a melt-flow index of 2 to 10 g/10 min in accordance with DIN 53735 (230° C./2.16 kg) and a density (23° C.) in accordance with DIN 53479 of 0.900 to 0.910 g/cm$^3$ may be mentioned as an example. Types of polypropylene differing from this, such as, for example, block copolymers or random copolymers, can, of course, be used.

Chalk or talc is suggested as filler for this example with an average particle size or 5 to 60 μm, better still with an average particle size of 20 to 30 μm. The proportion of fillers in the overall layer weight is preferably from 25 to 55% by weight. Below a filler proportion of 20% by weight, an adequate embrittlement of the polymer with the reduction in the puncture resistance and the resistance to further tearing connected thereto is normally no longer attained. With proportions clearly above 60% by weight, the production of the film becomes difficult and the physical resistance values are often no longer adequate for the typical uses.

As is customary in the production of polypropylene films, a rewinding is also carried out with the inventive push-through layer on a polypropylene basis for reasons of postcrystallization.

With a mixture of

50% by weight of polypropylene, homopolymer and

50% by weight of talc as filler, average particle size

20 μm, a film 150 μm thick was produced.

A puncture resistance of 162 N/mm and a resistance to further tearing of 3.2 N could be measured on this film.

From a mixture of

75% by weight of polypropylene, homopolymer and

25% by weight of talc as filler, average particle size 20 μm, a film 150 μm thick was produced.

A puncture resistance of 405 N/mm and a resistance to further tearing of 12 N could be measured on this film.

A different type of push-through layer can be obtained as follows:

As an alternative example for the polymer of the polymer matrix, a high crystalline polypropylene with a melt-flow index of approximately 8 g/10 min in accordance with DIN 53735 (230° C./2.16 kg) and a density (23° C.) in accordance with DIN 53479 of 0.902 g/cm$^3$ may be mentioned. Types of polypropylene differing from this can, of course, be used.

Chalk or talc is suggested as filler for this example with an average particle size of 5 to 60 μm, better still with an average particle size of 20 to 30 μm. The proportion of fillers in the total film weight is preferably from 10 to 55% by weight. Below a filler proportion of 5% by weight, an adequate embrittlement of the polymer with the reduction in the puncture resistance and the resistance to further tearing connected thereto is normally no longer attained. With proportions clearly above 60% by weight, the production of the film becomes difficult and the physical resistance values are often no longer adequate for the typical uses.

The processing can also take place with these materials as described above.

As is customary in the production of polypropylene films, a rewinding is also carried out in this case with the push-through layer on a polypropylene basis for reasons of postcrystallization.

With a mixture of

95% by weight of polypropylene, highly crystalline, of the Mitsui company with the product brand name CJ700, and 5% by weight of talc as filler, average particle size 20 μm, a film 150 μm thick was produced (density 0.93 g/cm$^3$)

A puncture resistance of 360 N/mm and a damage energy in accordance with DIN 53373 of 0.5 J/mm could be measured on this film.

From a mixture of

90% by weight of polypropylene, highly crystalline, of the Mitsui company with the product brand name CJ700, and 10% by weight of talc as filler, average particle size 20 μm, a film 150 μm thick was produced (density 0.965 g/cm$^3$).

A puncture resistance of 220 N/mm and a damage energy of 0.2 J/mm could be measured on this film.

If the mixture is adjusted to 80% by weight of polypropylene (specification see above) and 20% by weight of talc (specification see above), a puncture resistance of approximately 100 N/mm as well as a damage energy of 0.05 J/mm are obtained. The density of the material was determined at 1.04 g/cm$^3$.

A further alternative for the production of the push-through layer is described in the following, the push-through property being achieved with a single-phase polymer system and fillers serving only to optimize additional properties.

Production of the compound

The propylene polymers used in Examples 1 to 19 were mixed in powder form in an intensive mixer with 0.05% by weight of tris-(2,4-di-tert-butyl phenyl)-phosphite as processing stabilizer, 0.05% by weight of pentaerythritol-tetrakis[3-(3,5-di-tert-butyl-4-hydroxyphenyl) -propionate] as long-term stabilizer and 0.1% by weight of calcium stearate as well as with the respective resins and/or fillers as well as, where applicable, the nucleation agent and kneaded on a twin-screw extruder with a screw diameter of 50 mm and a l/D ratio of 15 D (type Collin ZK 50) at a melt temperature of 230° C. and subsequently granulated.

Production of the push-through film

The principle underlying the chill roll process is that a melt plasticated and homogenized in the extruder is continuously extruded under pressure from a slot die, the melt being brought into the rigid state on a cooling roll and the flat film being wound in the winding unit to form a roll.

The plastication of the granulate takes place in that a screw continuously conveys the plastic material through the heated cylinder zones, and the plastic material is thereby transformed into the state of a homogeneous compressed melt. A subsequent filter unit ensures the required build up of pressure in the cylinder and filters any impurities out of the melt.

The homogenized melt is conveyed further into a slot die where it is distributed such that it exits uniformly from the die slot.

The shaping of the flat film takes place by drawing the melt out of the slot die by means of a rotating chill roll (cooling roll 1) which is cooled evenly over its width, the melt being cooled upon contact with the roller and brought into the rigid state. The flow of air exiting out of the air blade, where necessary assisted by a suction blade, fixes the melt along a surface line on the cooling roll 1, thereby ensures good contact with the roll and thus initiates a uniform cooling of the melt.

A cooling roll with a larger film angle of wrap (cooling roll 1), combined with one or two subsequent cooling or attemperating rolls, is mainly used.

The mechanical and optical film properties are determined according to the cooling conditions of the film, the cooling roll 1 thereby having the greatest influence on the film properties.

Depending on the nature of the plant, the film is guided at a regulatable film tension over a thickness measuring device, an annealing station, film laying unit, cutting station, surface pretreatment station into the winding station where the film is then wound to form a film roll.

During this examination, the brittle character of the resinous mixtures likewise becomes visible. With an increasing amount of resin, considerably less force is necessary to penetrate the films—in addition, the distance until rupture of the film is considerably shorter than with the non-modified mixture.

In the following Table 1, the results are summarized which were determined on the films 30 μ and 50 μ thick at a chill roll temperature of 15° C. The test results were obtained with the Dynatest (DIN 53 373).

TABLE 1

|  | Film Thickness: 30 μ | | | | Film Thickness: 50 μ | | | |
| --- | --- | --- | --- | --- | --- | --- | --- | --- |
| Resin (B) | Fs N | Fs/D N/mm | Wges/D J/mm | Lges mm | Fs N | Fs/D N/mm | Wges/D J/mm | Lges mm |
| 0% | 16.8 | 552 | 1.2 | 4.8 | 49.6 | 965 | 9.6 | 17.1 |
| 5% R. 1128 | 14.1 | 458 | 0.8 | 3.8 | 34.6 | 715 | 2.4 | 6.8 |
| 10% R. 1128 | 9.1 | 311 | 0.4 | 2.6 | 19.9 | 398 | 0.6 | 3.6 |
| 15% R. 1128 | 7.6 | 257 | 0.3 | 2.3 | 13.2 | 272 | 0.3 | 2.7 |
| 20% R. 1128 | 6.5 | 215 | 0.2 | 2.0 | 11.3 | 223 | 0.2 | 2.4 |
| 25% R. 1128 | 5.4 | 185 | 0.2 | 1.8 | 9.1 | 193 | 0.2 | 2.1 |
| 10% R 125 | 9.4 | 318 | 0.4 | 2.7 | 17.8 | 357 | 0.5 | 3.3 |
| 15% R 125 | 8.2 | 270 | 0.3 | 2.4 | 13.0 | 263 | 0.3 | 2.6 |
| 20% R 125 | 6.5 | 217 | 0.2 | 2.1 | 10.8 | 221 | 0.2 | 2.3 |
| 10% R125/nuc | 9.2 |  | 0.4 | 2.6 | 16.7 | 334 | 0.4 | 3.1 |
| 0%/(A) nuc. | 17.1 | 576 | 1.5 | 5.3 | 33.0 | 678 | 2.7 | 7.6 |

The type Daplen DM 55, a polypropylene homopolymer with a melt-flow index (230/2.16) of 2.8 g/10 min, served as reference system and polymer (A) in the examples of Table 1.

The chill roll temperatures used for the production of the push-through film are listed in the following Table 2 as well as a plurality of parameters of the films thereby obtained.

The thickness of the films is 150 μm in Examples 1 to 19 and Comparative Example VI and 50 μm in Comparative Example V2 as well as Example 20.

The following have the specified meanings in Tables 1 and 2:
B powder: Propylene homopolymer with a melt-flow index (230/2.16) of 0.3 g/10 min
D powder: Propylene homopolymer with a melt-flow index (230/2.16) of 2.5 g/10 min
K powder: Propylene homopolymer with a melt-flow index (230/2.16) of 8.0 g/10 min
SVA 127: Propylene homopolymer with a melt-flow index (230/2.16) of 35 g/10 min
SVA 198: Propylene homopolymer with a melt-flow index (230/2.16) of 8.0 g/10 min with increased crystallinity
R 1128: hydrous hydrocarbon resin with a molecular weight of 2070 g/mol (weight average)
R 125: hydrous hydrocarbon resin with a molecular weight of 1200 g/mol (weight average)
R 101: hydrous hydrocarbon resin with a molecular weight of 820 g/mol (weight average)
R 1139: hydrous hydrocarbon resin with a molecular weight of 3170 g/mol (weight average)
Piccotac 115: hydrous hydrocarbon resin with a molecular weight of 2500 g/mol (weight average)

These products can be obtained from the Hercules company.

NA 11 UF : Sodium 2,2'-methylene-bis-(4,6-di-tertiary-butyl phenyl)phosphate (Asahi Denka company/Japan)
Talc A3: Talc with an average particle size of 3 μ
Talc A20: Talc with an average particle size of 20 μ
Talc A60: Talc with an average particle size of 60 μ

The above-mentioned types of talc are products of the Naintsch company, Austria.

Calcitec M5: Chalk with an average particle size of 5 μ

The parameter Wges/D corresponds to the penetration energy.

Alternatively to the fillers specified in Table 2, the following may be used with push-through force values within the range of the invention:
inorganic fillers
carbonates (chalk, dolomite)
barium sulfate
talc
mica
kaolin
wollastonite
silicates (glass beads, glass fibers)

organic fillers synthetic fibers (e.g. polyamide, Kevlar)
natural fibers (e.g. flax or cellulose fibers)

wood flour

The push-through layers described above can, as described first of all, be coextruded as such or together with a sealing layer and/or a seal/peel layer.

A pull-off layer, which can, where necessary, bear a seal/peel layer, is then laminated onto the push-through layer to form a cover film.

Alternatively, the pull-off layer can also be coextruded together with the push-through layer and additional function layers to form a cover film.

The packaging lower part is produced in the conventional manner from a deep-drawn film and has, where necessary and as described above, a sealing layer.

Once the recesses accommodating the goods have been filled, the packaging lower part is sealed to the cover film, the sealing tool being contoured such that a continuous seal around the individual recesses in the lower part is achieved but, on the other hand, surface regions of the cover film remain unsealed or only slightly or punctually sealed in order to thus form grip tabs.

The contour of the sealing tool also takes into consideration the fact that peeling fronts which are as narrow as possible are to be formed at the beginning of the separation of pull-off layer and push-through layer (cf. description of the drawings).

TABLE 2

| No. | Polymer (A) | Resin (B) | Nucleation Agent | Filler | MFI DIN 53735 (230/2) [g/10'] | Elmendorf ISO 6383/2 Long. N/MM | Elmendorf ISO 6383/2 Cross N/MM | Dynatest DIN 53373 Fs N | Dynatest DIN 53373 Fs/D N/mm | Dynatest DIN 53373 Wges/D J/mm | Dynatest DIN 53373 Lges mm |
|---|---|---|---|---|---|---|---|---|---|---|---|
| 1 | B powder | 25% R 1128 | | | 1.4 | 4.6 | 5.6 | 42.0 | 280.5 | 0.3 | 3.0 |
| 2 | SVA 127 | 10% R 1128 | | | 50.0 | 2.9 | 3.0 | 43.7 | 294.3 | 0.4 | 3.1 |
| 3 | SVA 127 | 25% R 1128 | | | 95.0 | 2.3 | 2.3 | 33.2 | 214.2 | 0.2 | 2.6 |
| 4 | D powder | 10% R 125 | 0.005% NA 11 UF | | 4.2 | 3.4 | 3.6 | 51.9 | 343.7 | 0.4 | 3.3 |
| 5 | D powder | 10% R 125 | 0.5% talc A3 | | 4.4 | 3.2 | 3.7 | 44.7 | 306.7 | 0.4 | 3.1 |
| 6 | K powder | 10% R 125 | | 2% talc A20 | 11.8 | 2.8 | 2.8 | 41.6 | 277.7 | 0.3 | 2.8 |
| 7 | K powder | 10% R 125 | | 25% talc A20 | 13.0 | 2.8 | 2.6 | 30.6 | 206.7 | 0.2 | 2.4 |
| 8 | K powder | 10% R 125 | | 30% talc A20 | 12.5 | 2.1 | 2.4 | 30.5 | 198.7 | 0.2 | 2.3 |
| 9 | K powder | 10% R 125 | | 35% talc A20 | 10.5 | 2.1 | 2.3 | 26.6 | 175.4 | 0.2 | 2.1 |
| 10 | K powder | 10% R 125 | | 35% talc A3 | 9.5 | 2.2 | 2.4 | 20.7 | 139.5 | 0.1 | 1.8 |
| 11 | K powder | 10% R 125 | | 35% talc A60 | 13.0 | 1.9 | 2.2 | 14.7 | 98.6 | 0.1 | 1.8 |
| 12 | K powder | 10% R 125 | | 35% Calcitec M5 | 11.0 | 2.4 | 2.7 | 48.9 | 348.5 | 0.7 | 4.3 |
| 13 | D powder | 25% R 101 | | | 7.1 | 2.8 | 3.1 | 41.7 | 273.1 | 0.3 | 2.9 |
| 14 | D powder | 25% R 1139 | | | 7.8 | 2.9 | 3.2 | 39.2 | 263.3 | 0.3 | 2.8 |
| 15 | D powder | 25% Piccotac 115 | | | 7.1 | 3.0 | 3.4 | 38.2 | 263.5 | 0.3 | 2.9 |
| 16 | SVA 198 | 1% R 125 | | | 9.0 | 3.9 | 4.9 | 90.9 | 612.7 | 1.1 | 4.7 |
| 17 | SVA 198 | 1% R 125 | 0.1% NA 11 UF | | 8.9 | 3.0 | 3.9 | 71.8 | 481.8 | 0.7 | 4.0 |
| 18 | SVA 198 | 3% R 125 | | | 9.5 | 4.0 | 5.2 | 76.6 | 513.3 | 0.8 | 4.2 |
| 19 | SVA 198 | 3% R 125 | 0.1% NA 11 UF | | 9.4 | 2.8 | 2.3 | 61.4 | 409.6 | 0.5 | 3.6 |
| V1 | K powder | | | 50% talc A20 | | 2.8 | 3.1 | 29.5 | 198.8 | 0.2 | 2.2 |
| V2 | D powder | | | | | | | | 965 | 9.6 | |
| 20 | D powder | | 0.1% NA 11 UF | | | | | | 678 | | |

Fs = maximum force for penetrating the film in N
Fs/D = maximum force of the film for penetrating the film in relation to the cross section in N/mm
Wges/D = maximum damaging energy for penetrating the film in J/mm
Lges = maximum path for penetrating the film in mm

We claim:

1. A packaging comprising:
   a product
   a packaging lower part having a cavity defining a product holding receptacle, said product being disposed within said receptacle; and
   a covering film covering said cavity thereby enclosing said product in said packaging, said covering film comprising:
   a sealing layer;
   a push-through layer covered on a surface thereof by said sealing layer, said sealing layer thereby connecting said push-through layer to said lower part;
   a seal/peel layer covering said push-through layer;
   a peelable pull-off layer covering said seal/peal layer, said seal/peal layer thereby peelably connecting said pull-off layer to said push-through layer whereby said pull-off layer may be peeled away from said push-through layer,
   wherein said seal/peel layer comprises a mixture of two polymeric components I and II, wherein said component I is selected from the group consisting of propylene homopolymers, copolymers of ethylene and propylene; copolymers of ethylene and butylene; copolymers of propylene and butylene; copolymers of ethylene and a different α-olefin with 5 to 10 carbon atoms; copolymers of propylene and a different α-olefin with 5 to 10 carbon atoms; terpolymers of ethylene and propylene and butylene; terpolymers of ethylene and propylene and a different α-olefin with 5 to 10 carbon atoms; and mixtures of two or more of the specified homopolymers, copolymers and terpolymers or a blend of two or more of the specified homopolymers, copolymers and terpolymers, optionally mixed with one or more of the specified homopolymers, copolymers and terpolymers, wherein said component II is a polymer incompatible with said component I.

2. A packaging according to claim 1, wherein said component II is selected from the group consisting of high density polyethylenes, medium density polyethylenes, low density polyethylenes, linear low density polyethylenes, very low density polyethylenes, and ultra low density polyethylenes.

3. A packaging according to claim 2, wherein said component II is produced using a metallocene catalyst.

4. A packaging according to claim 1, wherein said lower part comprises plural discrete subparts, each subpart individually containing a product such that product in any one subpart is continued in said packaging separately from product in any other subpart, said pull-off layer being provided in discrete sections, each one of said subparts having a corresponding section, whereby a section of said pull-off layer may be peeled away over one subpart and the product contained therein may be pushed through the remaining layers of said covering film without releasing product contained in other subparts.

5. Packaging as defined in claim 1, wherein said lower part is produced from a plastic material.

6. Packaging as defined in claim 5, wherein said plastic material is essentially the same as the material of said push-through layer.

7. Packaging as defined in claim 1, wherein the lower part has a sealing layer on a surface thereof to be connected with the push-through layer.

8. Packaging as defined in claim 1, wherein said sealing layer is produced by using a polyolefin selected from the group consisting of polypropylene random copolymers, terpolymers, ionomers, ethylene copolymers, acid-modified polyolefins, grafted polyolefins containing styrene and ethylene butylene blocks, polyolefins produced using a metallocene catalyst, random heterophase copolymers, highly amorphous polypropylenes, and mixtures of two or more of the aforementioned polymers.

9. Packaging as defined in claim 1, wherein said sealing layer comprises a material selected from the group consisting of ethylene butyl acrylate, ethylenevinyl acetate, ethylene ethyl acetate, ethylene acrylic acid, and ethylene maleic anhydride copolymers.

10. Packaging as defined in claim 1, wherein said sealing layer comprises a material selected from the group consisting of linear low, very low and ultra low density polyethylene copolymers.

11. Packaging as defined in claim 1, wherein said sealing layer comprises a terpolymer which is formed from propylene, ethylene and an additional α-olefin.

12. Packaging according to claim 11, wherein said α-olefin is selected from the group consisting of butene, hexene and octene.

13. Packaging as defined in claim 11, wherein the terpolymer is produced using a metallocene catalyst.

14. Packaging as defined in claim 1, wherein said sealing layer is selected from the group consisting of random copolymers and random heterophase copolymers of propylene with ethylene, butene, hexene and/or octene as comonomer.

15. Packaging as defined in claim 14, wherein the material of the sealing layer is grafted with maleic anhydride.

16. Packaging as defined in claim 14, wherein the propylene random copolymers and the random heterophase copolymers are produced using a metallocene catalyst.

17. Packaging as defined in claim 7, wherein the sealing layer is coextruded with the lower part.

18. Packaging as defined in claim 1, wherein the sealing layer is coextruded with the push-through layer.

19. Packaging as defined in claim 7 wherein the sealing layer is applied to the lower part as a lacquer coating.

20. Packaging as defined in claim 1, wherein the push-through layer comprises a polymer selected from the group consisting of PVC, polystyrene, styrene copolymerisates, polyester, and polyolefins.

21. Packaging as defined in claim 20, wherein the push-through layer comprises a polymer matrix containing a particulate filler selected and contained in such constituent amounts in the matrix that the puncture resistance of the push-through layer is reduced to below a limit of 450 N/mm, as measured on a film 150 $\mu$m thick.

22. Packaging as defined in claim 20, wherein the polyolefin of the push-through layer comprises polypropylene.

23. Packaging as defined in claim 22, wherein said polypropylene is produced using a metallocene catalyst.

24. Packaging as defined in claim 23, wherein the polypropylene of the push-through layer comprises high crystalline polypropylene.

25. Packaging as defined in claim 1, wherein the resistance to further tearing of the push-through layer is reduced to below a limit of 30 N.

26. Packaging as defined in claim 1, wherein the value of the puncture resistance of the push-through layer is approximately 50 to approximately 200 N/mm.

27. Packaging as defined in claim 1, wherein the resistance to further tearing is approximately 3 to 4 N.

28. Packaging as defined in claim 21, wherein said filler is selected from the group consisting of halogenated hydrocarbon polymers, polyether sulfones, cellulose, wood pulp, and duroplastic materials.

29. Packaging as defined in claim 21, wherein said filler is selected from the group consisting of $SiO_2$, silicates, titanates, $TiO_2$, aluminum oxide, kaolin, calcium carbonates, magnesites, MgO, iron oxides, silicon carbide, silicon nitride, and barium sulfate.

30. Packaging as defined in claim 21, wherein the filler content in the polymer matrix is approximately 5% by weight to approximately 60% by weight.

31. Packaging according to claim 30, wherein said filler content in the polymer matrix is approximately 10% by weight to approximately 55% by weight.

32. Packaging as defined in claim 20, wherein the particle size of the filler particles, measured over their greatest extension, is on average approximately 5 $\mu$m to 100 $\mu$m.

33. Packaging as defined in claim 1, wherein the push-through layer comprises a polymer phase containing a polyolefin (A) and a hydrocarbon resin component (B) dissolved therein, wherein the hydrocarbon resin component (B) is different from the polyolefin (A), and comprises cyclic side groups on the polymer chain and is contained in the push-through layer with a proportion of at least approximately 3% by weight of the total mass, wherein the proportion of the hydrocarbon resin component (B) is at the most approximately 30% by weight, wherein that the hydrocarbon resin component (B) is an amorphous polymer, and wherein a filler is contained in the push-through layer with a proportion of 0 to 35% by weight of the total mass, wherein the puncture resistance is reduced to below a limit of 450 N/mm.

34. Packaging as defined in claim 33, wherein the proportion of hydrocarbon resin (B) is at most approximately 25% by weight.

35. Packaging according to claim 34, wherein said filler is contained in the push-through layer in an amount of at most approximately 30% by weight.

36. Packaging according to claim 35, wherein said filler is contained in the push-through layer in an amount of at most approximately 25% by weight.

37. Packaging as defined in claim 1, wherein characterized in that the peel/seal layer is designed as a lacquer coating or coextruded together with the pull-off layer or the push-through layer.

38. Packaging as defined in claim 1, wherein the seal/peel layer is designed as an adhesive layer.

39. Packaging as defined in claim 1, wherein the seal/peel layer comprises a mixture of:
  a1) 30 to 80% by weight of a polymer mixture, consisting of
    a1.1) 60 to 98% by weight of a crystalline copolymer consisting of propylene with ethylene and/or an α-olefin of the formula $CH_2$—CHR, wherein R is a linear or branched alkyl radical with 2 to 8 carbon atoms, containing 85 to 99.5% by weight of propylene, and
    a1.2) 2 to 40% by weight of an elastic copolymer consisting of ethylene and propylene and/or an α-olefin of the formula $CH_2$—CHR, containing 20 to 70% by weight of ethylene or
  a2) 30 to 80% by weight of a highly amoiphous polypropylene with a crystalline polypropylene proportion of up to 10% by weigh with a melting enthalpy of at the most 40 J/g and a melt-flow index of between 0.1 and 100 g/10 min, wherein the polypropylene can be a homopolymer of the propylene or a copolymer of the propylene with one or more α-olefins and a propylene proportion of at least 80 mol %, and
  a3) 70 to 20% by weight of an ethylene polymerisate.

40. Packaging as defined in claim 1, wherein the seal/peel layer is sealable at temperatures of up to 180° C.

41. Packaging as defined in claim 1, wherein the pull-off layer is produced from a thermally stable material selected from the group consisting of unfilled and filled propylene homopolymers, high crystalline polypropylenes, paper, and oriented, filled or unfilled polyamide, polyester, or polypropylene polymers.

42. Packaging as defined in claim 1, wherein said covering film includes a heat-resistant protective layer.

43. Packaging as defined in claim 1, wherein the lower part is sealed to the cover film along a sealing seam around the individual goods so as to be essentially moisture proof and essentially oxygen-tight.

44. Packaging as defined in claim 43, wherein the peeling force is $\leq 5$ N, with a peeling front of 22 mm in width.

45. Packaging as defined in claim 44, wherein the peeling force is $\leq 3$ N with a peeling front of 22 mm in width.

46. Packaging as defined in claim 45, wherein the peeling force is $\leq 2N$ with a peeling front of 22 mm in width.

47. Packaging as defined in claim 4, wherein the cover film has a tear-initiation area designed such that first of all the cover film is adapted to be grasped as a whole but during the removal of the cover film along predetermined contours the pull-off layer of the cover film is separated from the push-through layer and the pull-off layer is adapted to be detached further on its own.

48. Packaging as defined in claim 47, characterized in that the contours of the tear-initiation area comprise an interrupted line, a saw tooth or wave shape or an angular shape directed contrary to the pull-off direction.

49. Packaging as defined in claim 47, characterized in that the tear-initiation area comprises a grip tab not sealed to the lower part and, where applicable, connected thereto via sealing points having a small area to ensure the plane state.

50. Packaging as defined in claim 1, characterized in that in the case of the cover film the pull-off layer is connected to the seal/peel layer and the push-through layer by means of a thermolaminating process.

51. A packaging comprising:
a product
a packaging lower part having a cavity defining a product holding receptacle, said product being disposed within said receptacle; and
a covering film covering said cavity thereby enclosing said product in said packaging, said covering film comprising:
a sealing layer;
a push-through layer covered on a surface thereof by said sealing layer, said sealing layer thereby connecting said push-through layer to said lower part;
said packaging including a peelable pull-off layer covering said push-through layer, whereby said pull-off layer may be peeled away from said push-through layer, wherein said sealing layer comprises a polymer selected from the group consisting of polypropylene random copolymers, terpolymers, ionomers, ethylene copolymers, acid-modified polyolefins, grafted polyolefins containing styrene and ethylene butylene blocks, polyolefins produced using a metallocene catalyst, random heterophase copolymers, highly amorphous polypropylenes, and mixtures of two or more of the aforementioned polymers,
wherein said lower part comprises plural discrete subparts, each subpart individually containing a product such that product in any one subpart is continued in said packaging separately from product in any other subpart, said pull-off layer being provided in discrete sections, each to one of said subparts having a corresponding section, whereby a section of said pull-off layer may be peeled away over one subpart and the product contained therein may be pushed through the remaining layers of said covering film without releasing product contained in other subparts,
wherein the lower part has a sealing layer on a surface thereof to be connected with the push-through layer,
wherein said sealing layer comprises a terpolymer which is formed from propylene, ethylene and an additional α-olefin.

52. Packaging according to claim 51, wherein said α-olefin is selected from the group consisting of butene, hexene and octene.

53. A packaging comprising:
a product
a packaging lower part having a cavity defining a product holding receptacle, said product being disposed within said receptacle; and
a covering film covering said cavity thereby enclosing said product in said packaging, said covering film comprising:
a sealing layer;
a push-through layer covered on a surface thereof by said sealing layer, said sealing layer thereby connecting said push-through layer to said lower part;
said packaging including a peelable pull-off layer covering said push-through layer, whereby said pull-off layer may be peeled away from said push-through layer, wherein said sealing layer comprises a polymer selected from the group consisting of polypropylene random copolymers, terpolymers, ionomers, ethylene copolymers, acid-modified polyolefins, grafted polyolefins containing styrene and ethylene butylene blocks, polyolefins produced using a metallocene catalyst, random heterophase copolymers, highly amorphous polypropylenes, and mixtures of two or more of the aforementioned polymers,
wherein said sealing layer is selected from the group consisting of random copolymers and random heterophase copolymers of propylene with ethylene, butene, hexene and/or octene as comonomer.

54. Packaging as defined in claim 53, wherein the material of said sealing layer is grafted with maleic anhydride.

55. Packaging as defined in claim 53, wherein the propylene random copolymers and the random heterophase copolymers are produced using a metallocene catalyst.

56. Packaging as defined in claim 51, wherein the terpolymer is produced using a metallocene catalyst.

57. A packaging comprising:
a product
a packaging lower part having a cavity defining a product holding receptacle, said product being disposed within said receptacle; and
a covering film covering said cavity thereby enclosing said product in said packaging, said covering film comprising:
a sealing layer;
a push-through layer covered on a surface thereof by said sealing layer, said sealing layer thereby connecting said push-through layer to said lower part;
said packaging including a peelable pull-off layer covering said push-through layer, whereby said pull-off layer may be peeled away from said push-through layer, wherein said sealing layer comprises a polymer selected from the group consisting of polypropylene random copolymers, terpolymers, ionomers, ethylene copolymers, acid-modified polyolefins, grafted polyolefins containing styrene and ethylene butylene blocks, polyolefins produced using a metallocene catalyst, random heterophase copolymers, highly amorphous polypropylenes, and mixtures of two or more of the aforementioned polymers, wherein the push-through layer comprises a polymer selected from the group consisting of PVC, polystyrene, styrene copolymerisates, polyester, and polyolefins, wherein the push-through layer comprises a polymer matrix containing a particulate filler selected and contained in such constituent amounts in the matrix that the puncture resistance of the push-through layer is reduced to below a limit of 450 N/mm, as measured on a film 150 µm thick.

58. A packaging comprising:

a product a packaging lower part having a cavity defining a product holding receptacle, said product being disposed within said receptacle; and a covering film covering said cavity thereby enclosing said product in said packaging, said covering film comprising:

a sealing layer;

a push-through layer covered on a surface thereof by said sealing layer, said sealing layer thereby connecting said push-through layer to said lower part; said packaging including a peelable pull-off layer covering said push-through layer, whereby said pull-off layer may be peeled away from said push-through layer, wherein said sealing layer comprises a polymer selected from the group consisting of polypropylene random copolymers, terpolymers, ionomers, ethylene copolymers, acid-modified polyolefins, grafted polyolefins containing styrene and ethylene butylene blocks, polyolefins produced using a metallocene catalyst, random heterophase copolymers, highly amorphous polypropylenes, and mixtures of two or more of the aforementioned polymers, wherein the push-through layer comprises a polymer selected from the group consisting of PVC, polystyrene, styrene copolymerisates, polyester, and polyolefins, wherein the polyolefin of the push-through layer comprises polypropylene.

59. Packaging as defined in claim 58, wherein the polypropylene of the push-through layer comprises high crystalline polypropylene.

60. Packaging as defined in claim 57, wherein said filler is selected from the group consisting of halogenated hydrocarbon polymers, polyether sulfones, cellulose, wood pulp, and duroplastic materials.

61. Packaging as defined in claim 57, wherein said filler is selected from the group consisting of $SiO_2$, silicates, titanates, $TiO_2$, aluminum oxide, kaolin, calcium carbonates, magnesites, MgO, iron oxides, silicon carbide, silicon nitride, and barium sulfate.

62. Packaging as defined in claim 57, wherein the filler content in the polymer matrix is approximately 5% by weight to approximately 60% by weight.

63. Packaging according to claim 62, wherein said filler content in the polymer matrix is approximately 10% by weight to approximately 55% by weight.

64. Packaging as defined in claim 57, wherein the particle size of the filler particles, measured over their greatest extension, is on average approximately 5 µm to 100 µm.

65. A packaging comprising:

a product a packaging lower part having a cavity defining a product holding receptacle, said product being disposed within said receptacle; and a covering film covering said cavity thereby enclosing said product in said packaging, said covering film comprising:

a sealing layer;

a push-through layer covered on a surface thereof by said sealing layer, said sealing layer thereby connecting said push-through layer to said lower part;

said packaging including a peelable pull-off layer covering said push-through layer, whereby said pull-off layer may be peeled away from said push-through layer, w0herein said sealing layer comprises a polymer selected from the group consisting of polypropylene random copolymers, terpolymers, ionomers, ethylene copolymers, acid-modified polyolefins, grafted polyolefins containing styrene and ethylene butylene blocks, polyolefins produced using a metallocene catalyst, random heterophase copolymers, highly amorphous polypropylenes, and mixtures of two or more of the aforementioned polymers, wherein the push-through layer comprises a polymer phase containing a polyolefin (A) and a hydrocarbon resin component (B) dissolved therein, wherein the hydrocarbon resin component (B) is different from the polyolefin (A), and comprises cyclic side groups on the polymer chain and is contained in the push-through layer with a proportion of at least approximately 3% by weight of the total mass, wherein that the proportion of the hydrocarbon resin component (B) is at the most approximately 30% by weight, wherein the hydrocarbon resin component (B) is an amorphous polymer, and wherein a filler is contained in the push-through layer with a proportion of 0 to 35% by weight of the total mass, wherein the puncture resistance is reduced to below a limit of 450 N/mm.

66. Packaging as defined in claim 65, wherein the proportion of hydrocarbon resin (B) is at most approximately 25% by weight.

67. Packaging according to claim 66, wherein said filler is contained in the push-through layer in an amount of at most approximately 30% by weight.

68. Packaging according to claim 67, wherein said filler is contained in the push-through layer in an amount of at most approximately 25% by weight.

69. A packaging comprising:

a product a packaging lower part having a cavity defining a product holding receptacle, said product being disposed within said receptacle; and a covering film covering said cavity thereby enclosing said product in said packaging, said covering film comprising:

a sealing layer;

a push-through layer covered on a surface thereof by said sealing layer, said sealing layer thereby connecting said push-through layer to said lower part; said packaging including a peelable pull-off layer covering said push-through layer, whereby said pull-off layer may be peeled away from said push-through layer, wherein said sealing layer comprises a polymer selected from the group consisting of polypropylene random copolymers, terpolymers, ionomers, ethylene copolymers, acid-modified polyolefins, grafted polyolefins containing styrene and ethylene butylene blocks, polyolefins produced using a metallocene catalyst, random heterophase copolymers, highly amorphous polypropylenes, and mixtures of two or more of the aforementioned polymers, wherein the peelable connection is formed by means of a seal/peel layer, wherein said seal/peel layer comprises a mixture of two polymeric components I and II, wherein said component I is selected from the group consisting of propylene homopolymers, copolymers of ethylene and propylene; copolymers of ethylene and butylene; copolymers of propylene and butylene, copolymers of ethylene and a different α-olefin with 5 to 10 carbon atoms, copolymers of propylene and a different αolefin with 5 to 10 carbon atoms; terpolymers of ethylene and propylene and butylene, terpolymers of ethylene and propylene and a different α-olefin with 5 to 10 carbon atoms; and mixtures of two or more of the specified homopolymers, copolymers and terpolymers or a blend of two or more of the specified homopolymers, copolymers and terpolymers, wherein said component II is a polymer incompatible with said Component I.

70. Packaging as defined in claim 69, wherein said component II is selected from the group consisting of high density polyethylenes, medium density polyethylenes, low density polyethylenes, linear low density polyethylenes, very low density polyethylenes, and ultra low density polyethylene.

71. Packaging according to claim 70, wherein said component II is provided using a metallocene catalyst.

72. A packaging comprising:
   a product
   a packaging lower part having a cavity defining a product holding receptacle, said product being disposed within said receptacle; and
   a covering film covering said cavity thereby enclosing said product in said packaging, said covering film comprising:
   a sealing layer;
   a push-through layer covered on a surface thereof by said sealing
   layer, said sealing layer thereby connecting said push-through layer to said lower part;
   said packaging including a peelable pull-off layer covering said push-through layer, whereby said pull-off layer may be peeled away from said push-through layer, wherein said sealing layer comprises a polymer selected from the group consisting of polypropylene random copolymers, terpolymers, ionomers, ethylene copolymers, acid-modified polyolefins, grafted polyolefins containing styrene and ethylene butylene blocks, polyolefins produced using a metallocene catalyst, random heterophase copolymers, highly amorphous polypropylenes, and mixtures of two or more of the aforementioned polymers,
   wherein the peelable connection is formed by means of a seal/peel layer, wherein the seal/peel layer comprises a mixture of:
   a1) 30 to 80% by weight of a polymer mixture, consisting of
      a1.1) 60 to 98% by weight of a crystalline copolymer consisting of propylene with ethylene and/or an α-olefin of the formula $CH_2$—CHR, wherein R is a linear or branched alkyl radical with 2 to 8 carbon atoms, containing 85 to 99.5% by weight of propylene, and
      a1.2) 2 to 40% by weight of an elastic copolymer consisting of ethylene and propylene and/or an α-olefin of the formula $CH_2$—CHR, containing 20 to 70% by weight of ethylene or
   a2) 30 to 80% by weight of a highly amorphous polypropylene with a crystalline polypropylene proportion of up to 10% by weight with a melting enthalpy of at the most 40 J/g and a melt-flow index of between 0.1 and 100 g/10 min, wherein the polypropylene can be a homopolymer of the propylene or a copolymer of the propylene with one or more α-olefins and a propylene proportion of at least 80 mol %, and
   a3) 70 to 20% by weight of an ethylene polymerisate.

* * * * *

UNITED STATES PATENT AND TRADEMARK OFFICE
CERTIFICATE OF CORRECTION

PATENT NO. : 6,006,913
DATED : December 28, 1999
INVENTOR(S) : Ludemann et al.

It is certified that error appears in the above-identified patent and that said Letters Patent is hereby corrected as shown below:

In col. 11, l. 13: "wherein The" should read -- wherein the --.

In col. 11, ll. 34 and 40: "$CH_2$—CHR" should read --$CH_2$=CHR--.

In col. 15, l. 63: "compound" should read --compound:--.

In col. 16, l. 9: "film" should read --film:--.

In col. 17, l. 65: "fillers" should read --fillers:--.

In col. 18, l. 26: "fillers" should read --fillers:--.

IN THE CLAIMS:

In claim 11, col. 21, l. 15: "αolefin" should read --α-olefin--.

In claim 39, col. 22, l. 53: "containing20" should read --containing 20--.

In claim 39, col. 22, l. 55: "amoiphous" should read --amorphous--.

UNITED STATES PATENT AND TRADEMARK OFFICE
CERTIFICATE OF CORRECTION

PATENT NO.   : 6,006,913
DATED        : December 28, 1999
INVENTOR(S)  : Ludemann et al.

It is certified that error appears in the above-identified patent and that said Letters Patent is hereby corrected as shown below:

In claim 39, col. 22, l. 57: "weigh" should read --weight--.

In claim 43, col. 23, l. 9: "moisture proof" should read --moistureproof--.

In claim 65, col. 26, l. 17: "w0herein" should read --wherein--.

In claim 69, col. 27, l. 18: "αolefin" should read --α-olefin--.

In claim 72, col. 28, ll. 25 and 31: "CH$_2$—CHR" should read --CH$_2$=CHR--.

Signed and Sealed this

Twenty-first Day of November, 2000

*Attest:*

Q. TODD DICKINSON

*Attesting Officer*            *Director of Patents and Trademarks*